United States Patent
Friedman (10) Patent No.: US 6,591,256 B1
(45) Date of Patent: Jul. 8, 2003

(54) BUSINESS FOCUSED INTERFACE FOR ENGAGING APPLICATIONS THAT SOLVE MATHEMATICAL PROBLEMS

(76) Inventor: Craig Friedman, 115 W. 86th St., #11C, New York, NY (US) 10024

(*) Notice: Subject to any disclaimer, the term of this patent is extended or adjusted under 35 U.S.C. 154(b) by 0 days.

(21) Appl. No.: 09/523,768

(22) Filed: Mar. 11, 2000

(51) Int. Cl.$^7$ .............................................. G06F 15/18
(52) U.S. Cl. ........................................... 706/45; 46/47
(58) Field of Search ................................... 706/45–61

(56) References Cited

U.S. PATENT DOCUMENTS

| | | | | |
|---|---|---|---|---|
| 5,701,400 A | * | 12/1997 | Amado | 706/45 |
| 5,765,028 A | * | 6/1998 | Gladden | 706/25 |
| 5,784,539 A | * | 7/1998 | Lenz | 706/45 |
| 5,987,443 A | * | 11/1999 | Nichols et al. | 706/45 |
| 6,003,021 A | * | 12/1999 | Zadik et al. | 706/47 |
| 6,016,486 A | * | 1/2000 | Nichols | 706/47 |
| 6,018,730 A | * | 1/2000 | Nichols et al. | 706/45 |
| 6,018,731 A | * | 1/2000 | Bertrand et al. | 706/47 |
| 6,026,386 A | * | 2/2000 | Lannert et al. | 706/45 |
| 6,029,158 A | * | 2/2000 | Bertrand et al. | 706/45 |

OTHER PUBLICATIONS

Artificial Intelligence and Simulation: An Introduction, R. Greer Lavery; ACM, Proceedings of the 1986 Winter Simulation Conference, J. Wilson; J. Henriksen; S. Roberts (eds.).*

A Blackboard Architecture for the Decision Support Process, Ajay S. Vinze; Arun Sen; (1990) ACM, 089791–416–3.*

The Friendly Intelligent Tutoring Environment—Teac her's Approach, Ljubomir Jerinic and Vladan Devedzic; ACM SIGCHI Bulletin, vol. 32, Issue 1, (Jan. 2000), pps. 83–94.*

* cited by examiner

Primary Examiner—Wilbert L. Starks, Jr.
Assistant Examiner—Michael B. Holmes
(74) Attorney, Agent, or Firm—Henry Brendzel (57) ABSTRACT

An arrangement presents to a user a structured display that includes business problems categories and specific business problems. When a user selects a business problem to be solved, a generic mathematical problem-solving software module is executed. The module obtains information from the user, solves the problem, and returns results couched in terms of the business problem that was presented. In one useful embodiment, the server that includes the arrangement is coupled to the Internet, and interacts with users to receive problems and output results through the Internet.

16 Claims, 8 Drawing Sheets

| FILE | EDIT | VIEW | MESSAGES | COMMUNICATION | HELP |

| SOURCE | MIN. OUTPUT | MAX. OUTPUT |
|---|---|---|
| MICHIGAN | 14 | 20 |
| S. CAROLINA | 0 | 41 |

200

: SOURCE TABLE COMPLETE :

| DESTINATION | MIN. # UNITS | MAX. # UNITS |
|---|---|---|
| NYC | 15 | 18 |
| CHICAGO | 25 | 25 |
| LOS ANGELES | 16 | 2000 |

202

: DESTINATION TABLE COMPLETE :

| | NYC | CHICAGO | LOS ANGELES |
|---|---|---|---|
| MICHIGAN | 1.3 | 1.2 | 1.0 |
| S. CAROLINA | 1.2 | 1.0 | 1.1 |

204

PROCEED

FIG. 6

| | NYC | CHICAGO | LOS ANGELES |
|---|---|---|---|
| MICHIGAN | 0 | 0 | 16 |
| S. CAROLINA | 15 | 25 | 1.1 |

205

TOTAL MINIMUM COST: 59

| | RATE OF CHANGE OF MIN. COST WITH RESPECT TO MIN DISTRIBUTION | RATE OF CHANGE OF MIN. COST WITH RESPECT TO MAX DISTRIBUTION |
|---|---|---|
| NYC | 1.2 | 0.0 |
| CHICAGO | 1.0 | 1.0 |
| LOS ANGELES | 1.0 | 0.0 |

| FILE | EDIT | VIEW | MESSAGES | COMMUNICATION | HELP |

| | TSK1 | TSK2 | TSK3 |
|---|---|---|---|
| ASSIGNMENT1 | | | |
| ASSIGNMENT2 | | | |
| ASSIGNMENT3 | | | |
| ASSIGNMENT4 | | | |

214

OK

| TSK1 | DESCRIPTION OF TASK 1 |
| TSK2 | DESCRIPTION OF TASK 2 |
| TSK2 | DESCRIPTION OF TASK 3 |

TASK TABLE COMPLETE

210

| | TSK1 | TSK2 | TSK3 |
|---|---|---|---|
| ASSIGNMENT1 | C11 | C12 | C13 |
| ASSIGNMENT2 | C21 | C22 | C23 |
| ASSIGNMENT3 | C31 | C32 | C33 |
| ASSIGNMENT4 | C41 | C42 | C43 |

COST TABLE COMPLETE

| FILE | EDIT | VIEW | MESSAGES | COMMUNICATION | HELP |

MINIMUM COST: 37

|  | TSK1 | TSK2 | TSK3 |
|---|---|---|---|
| MACHINE1 | X | | |
| MACHINE2 | | X | |
| MACHINE3 | | | X |

214

| TSK1 | DESCRIPTION OF TASK 1 |
| TSK2 | DESCRIPTION OF TASK 2 |
| TSK2 | DESCRIPTION OF TASK 3 |
| | |

210

TASK TABLE COMPLETE

|  | TSK1 | TSK2 | TSK3 |
|---|---|---|---|
| MACHINE1 | 14 | 17 | |
| MACHINE2 | 17 | 13 | 19 |
| MACHINE3 | 16 | 12 | 14 |

212

COST TABLE COMPLETE

OK

BUSINESS FOCUSED INTERFACE FOR ENGAGING APPLICATIONS THAT SOLVE MATHEMATICAL PROBLEMS

BACKGROUND OF THE INVENTION

This relates to mathematics-based business solutions, and more particularly, to a guided provision of business solutions, for example, on the Internet.

Accessing programs through the Internet is not new. In one form of accessing, providers of software offer users to buy software via the Internet, and to download updates via the Internet. There are also many sites that offer "freeware," and "shareware." In all of these applications, the final resting place of the application is the user's PC, workstation or terminal. Another form of accessing is application hosting. Providers of application hosting, often referred to as applications service providers or ASPs, structure financial arrangements with users where, for a specified fee, the user can access and execute various applications on the provider's server. That is, the user is connected to the site, activates a particular application that he or she chooses, provides the data for the applications, and receives the results. The results are typically stored in the user's PC, workstation or terminal, or are printed on the user's printer. One such ASP, for example, can be found at http://www.corio.com. This ASP offers access to various applications based on a monthly fee; e.g., a "Return on investment" (ROI) application.

With respect to solving business applications, this is a partial step in the right direction because it frees the businessman from buying and maintaining numerous software packages. Alas, it is wholly focused on providing what the user already knows that he, or she, needs or wants. It is wholly inadequate for the businessman who is not computer and operations systems savvy.

SUMMARY

An advance in the art is realized with an arrangement and a method for providing application software in a user-friendly way; in particular, software that solves business problems by invoking solutions of generic mathematical problems which are hidden from the user. In one realization, for example, the arrangement is embodied in an Internet site that presents a web page to a user. The web page presents its wares in lay terms, couched in terms of business problems that need to be solved. Moreover, the collection of software that is offered to the user is structured, in a tree fashion for example, to allow for easy navigating by unsophisticated users through the collection. The structure facilitates the user reaching the business problem that the user is interested in solving, and once the user identifies and selects the business problem that the user is interested in solving, the correct generic mathematical problem is executed. The user is prompted for input data, and a solution is provided in response to that data.

DETAILED DESCRIPTION

Figure 1:
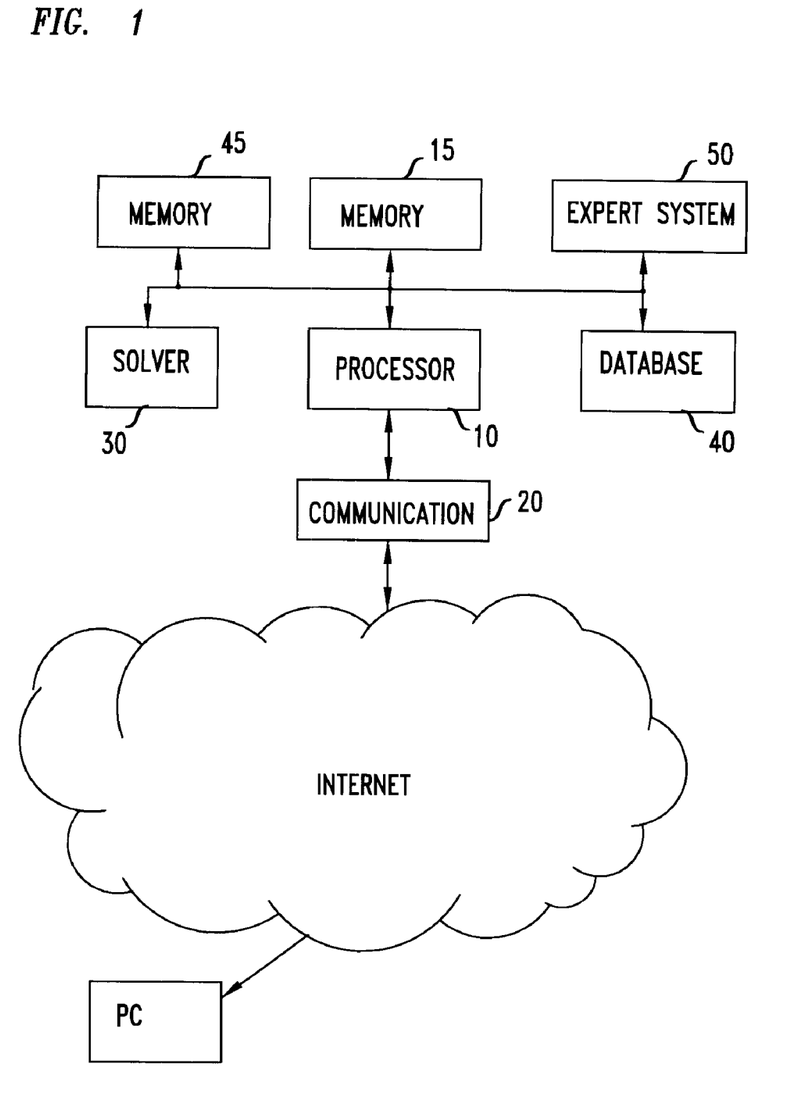
FIG. 1 presents a block diagram of a web server that may be employed in conformance with the principles disclosed herein.

FIG. 1 presents a block diagram of an Internet realization of an applications server in accordance with the principles disclosed herein. It comprises a processor 10 with an attendant working and program memory 15, and a coupled communications module 20. The arrangement of elements 10, 15, and 20 is perfectly conventional in the web server art. Also included is a generic mathematical solver store 30, which stores software packages, a database 40 of explanation comments, and optionally, a web pages memory 45, and an expert system 50. Elements 30, 40, 45 and 50 are coupled to processor 10. Processor 10 together with its operating system programs and communication module 20 form a web server that can be connected to the Internet. When so connected, remote users can connect to the FIG. 1 system and receive from the FIG. 1 site web pages, and through the use of a web browser (a software application on the user's PC, workstation or terminal) display the received web pages. Each web page is an html file that translates to a displayable page that is often longer than what can be shown at one time on the computer's screen. Portions of the file that cannot be seen on the screen can be made visible by scrolling through the file through clicks with a pointing device on the vertical scroll bar. That is, the user's PC, workstation or terminal has a pointing device, such as a mouse, and the position of a curser on the screen can be modified (to point to some area of the screen) by manipulating the mouse. The mouse has a left command button and a right command button (on many PC, workstation or terminals), which can be "clicked."

For purposes of this disclosure, the portion of a web page that appears on the computer screen first shall be termed the "first screen" of the web page.

Figure 2:
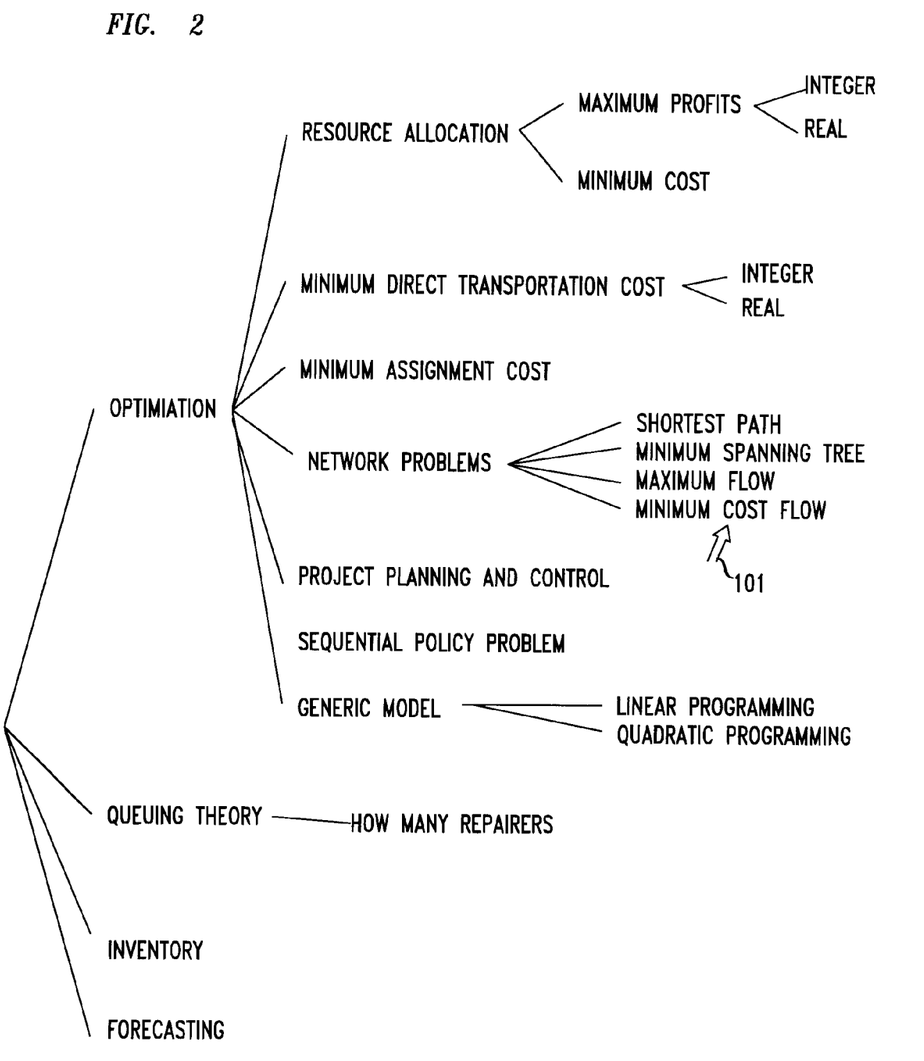
FIG. 2 illustrates a hierarchical tree that might lead a user to a specific business problem that the user wishes to solve.

FIG. 2 presents an approximate image of the first screen of a web page in an Internet realization of this invention. The page includes pre-designated areas with text, and lines that show the relationships between areas. The relationships form a hierarchical structure. The hierarchical structure aims to impart a logical cohesiveness to the displayed matter. The requirements of patent drawings (for example, size of letters) prevent demonstrating all features of a web page that can be utilized, but one can imagine that the lettering can be made quite small and that, therefore, the page's first screen worth can be made to contain a large number of entries/areas. Of course, since scrolling is possible, one is not limited to the first screen of the web page and, therefore, the number of entries/areas in the depicted structure is almost unlimited. Further, in connection with the principles disclosed herein there is no obligation to use any particular organization, or structure. Whatever makes logical sense that would assist a user in arriving at the business problem that the user wishes to solve is acceptable. It is noted that the FIG. 2 image shows a tree structure with a root node 100, various intermediate nodes, and leaf nodes. A leaf node is a node that is a terminus node; one that has no other nodes, or leaves, emanating from it.

The short text phrases in the FIG. 2 web page are associated with a collection of identifiable areas. In accordance with conventional operation of web browsers, clicking on any of the identifiable areas results is some action being taken, as specified in the displayed html file. In FIG. 2, the identifiable areas are associated with business problems or categories of problems, and the short phrases characterize those problems or categories of problems. More particularly, the areas of the leaf nodes are associated with particular business problems, which map onto generic mathematical problems, whereas the areas at the non-leaf nodes are associated with problem categories. A problem category is one that represents a collection of business problems that, in the mind of a significant number of users, rightly belong to the group. The business problems in the group can be solved by mapping the business problem to one or more generic mathematical problems. The collection of business problems in a group may, or may not, be mapped to the same generic mathematical problem of problems. To reiterate, a node in the FIG. 2 web page is but a stop along the route to identifying a specific leaf. No substantive programs need to be executed in any of the non-leaf nodes.

In accordance with the principles of this invention, the short phrases refer to business problems or categories of problems that a user might wish to have solved, rather than to the underlying generic mathematical problems or categories of problems. A particular phrase can, of course, be equally descriptive of a business problem and of the underlying mathematical problem, particularly at higher levels of the depicted tree, but the intent is that, wherever a choice can be made to employ a phrase that is business related or a phrase that is mathematics related, the former is chosen.

The goal is to provide users at each node, be it a leaf node or a non-leaf node, with a clear and simple module of information that would assist the user in deciding whether the user should pursue down the tree at the node that the user is at, or back upwards in the tree, and try another path. However, phrases that are very short—which is desirable for presentation purposes—are often not "clear and simple" modules of information. Brevity often begets ambiguity.

As already indicated, one salient feature of browsers is that the position of a curser (101 in FIG. 2) can be manipulated by the user through a pointing device, such as a mouse. Clicking a command button associated with the pointing device (such as the left button on the mouse) when pointing to a particular area on the screen causes an action to take place as specified by the displayed html file. The action can be taken pursuant to information that the file html file provides, pursuant to information stored elsewhere in the user's PC, workstation or terminal, a change in the Internet connection of the user's PC, workstation or terminal, or a communication back to the web server.

Figure 3:
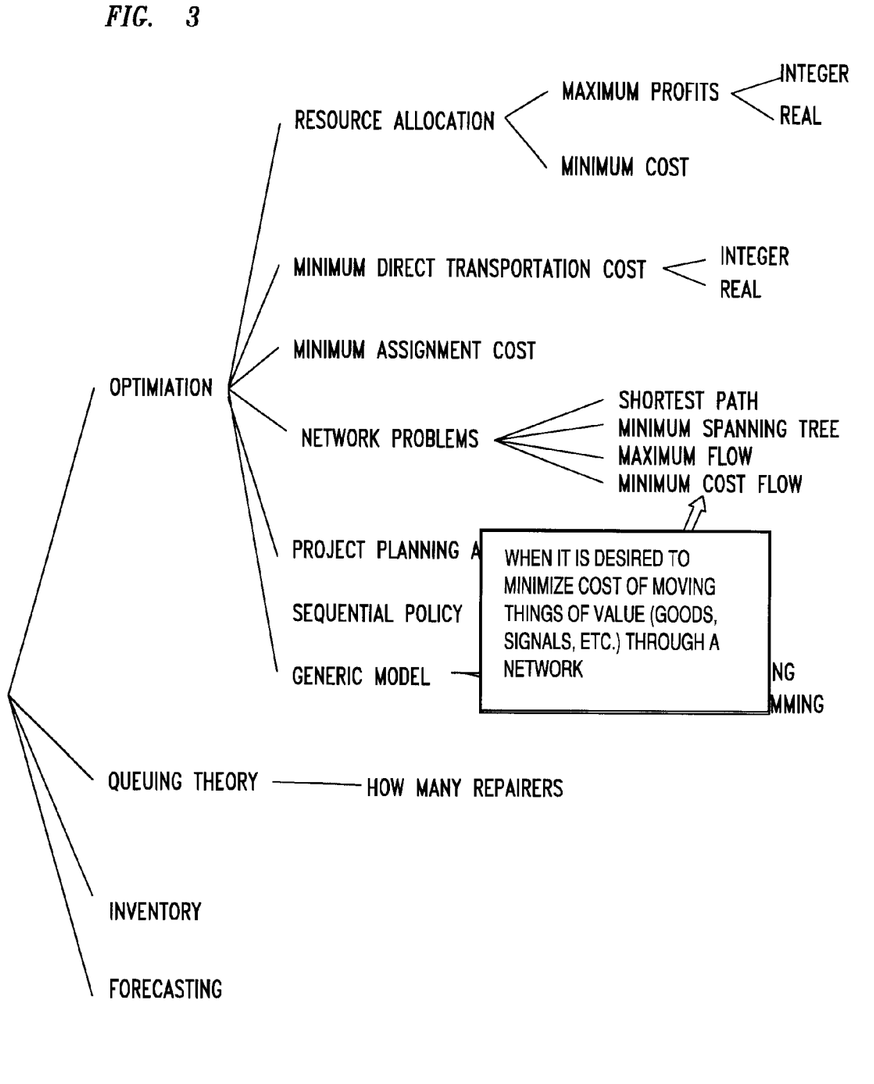
FIG. 3 illustrates the manner by which explanatory notes are presented to users.

Employing this conventional web browser capability, the above-described potential ambiguity problem that results from the brevity of text that is shown in the web page depicted in FIG. 1, in accordance with the principles disclosed herein, whenever the user clicks on a node with the left command button of the mouse, an explanation is posted on the screen, which relates to the node to which the curser is pointing. This is illustrated in FIG. 3, were the curser points to the node labeled "minimum cost flow." The information that is presented in connection with each node, such as the information shown in FIG. 3, is obtained from database 40. The technique by which a text is displayed in response to a click on a recognized area of the web page is well known in the art. The text that is so depicted advantageously explains in simple terms not only the category of the node to which the pointing device is pointing but also what the children nodes are about.

It may be desirable to pack a fairly large number of the identifiable areas within a single screen of the web page (i.e., the first screen) because it is useful for users to have a comprehensive picture of the hierarchical tree. However, that might necessitate using relatively small fonts. An enhanced arrangement is realized by providing a "zoom in" and a corresponding "zoom out" capability. The "zoom in" capability enlarges the image and centers it. This can be accomplished in a variety of ways. In accordance with one illustrative embodiment, this is accomplished with memory 45 in the FIG. 1 server that stores a plurality of web pages; each corresponding to the image that would be desired for a given zoom level and a given center point. The web page with the smallest "zoom in" factor is the web page that encompasses the entire FIG. 2 hierarchical tree in the a single screen of the user's computer, e.g., the first screen. Because of their enlargement factor, all other web pages in memory 45 display less the entirety of the tree. More specifically, there is a set of web pages for each zoom level, and the web pages in the set differ in that each displays a different area of the FIG. 2 tree at the center of the PC, workstation or terminal's screen. For example, memory 45 contains a web page that displays the FIG. 2 image, another web page that displays, for example, that portion of the FIG. 2 tree that places "Networking Problems" in the center of the screen, with a zoom level that prevents showing areas "Inventory" and "Forecasting" on the screen, yet another web page that displays, for example, that portion of the FIG. 1 tree that places "Queuing Theory" in the center of the screen, with a zoom level that prevents showing area "Optimization" and all nodes emanating therefrom on the screen.

Thus, when the user is looking at a particular web page and wishes to zoom in, the user clicks on the "zoom in" icon at the top of the web page, then points to a node on the screen, and clicks on the left command button of the mouse. Clicking on the "zoom in" tool bar icon conditions the server to treat the next left command button to act on the zoom in request, rather than to display to explanatory message that is associated with the pointed-to node. Acting on the zoom request merely means identifying the web page in memory 45 that corresponds to the next zoom level, identifying the center node in the displayed page, and retrieving the appropriate web page. To merely shift the displayed image so that another area of the FIG. 2 tree is in the center, the "shift" command button is clicked at the top of the web page, rather than the "zoom in" or "zoom out" command button but, otherwise, the operation is the same.

The ability to display the entirety of the FIG. 2 structure, the ability to zoom in, and the ability to receive clear and detailed explanations of the nodes and leaves that may be reached from the nodes all assist the user to find a leaf node in the FIG. 2 structure that most closely relates to the business problem that the user wishes to solve. To assist further, the FIG. 1 arrangement includes an expert system 50 that the user can activate by clicking on an "expert system" command button at the top of the web page. Expert system 50 is conventional except, of course, for the actual information it contains. Much like the "Office Assistant" software that is available, for example, in Microsoft WORD, or like Help capability in many other windows applications, the user is provided with a means to input words of interest, and the expert system presents the user with choices of intermediate or leaf nodes. The expert system can be quite simple, comprising merely a table of key words and the "expert" answers; or it may be quite sophisticated, allowing for Boolean statements, etc.

Once the user arrives at a desired leaf node, the user will likely want to actually proceed with a specific problem. This is accomplished by launching the application that is associated with the pointed to leaf via a double-click of the left command button of the mouse, or by any other means that the designer of the web page may choose. The user is queried as to which data transmission mode he will choose; the modes include, but are not limited to, manual population of a web based user interface, email, providing the URL of a user controlled web page on which data are posted, and lookup of data posted by third parties on the Internet. The format that the data must take is specified precisely.

Figure 4:
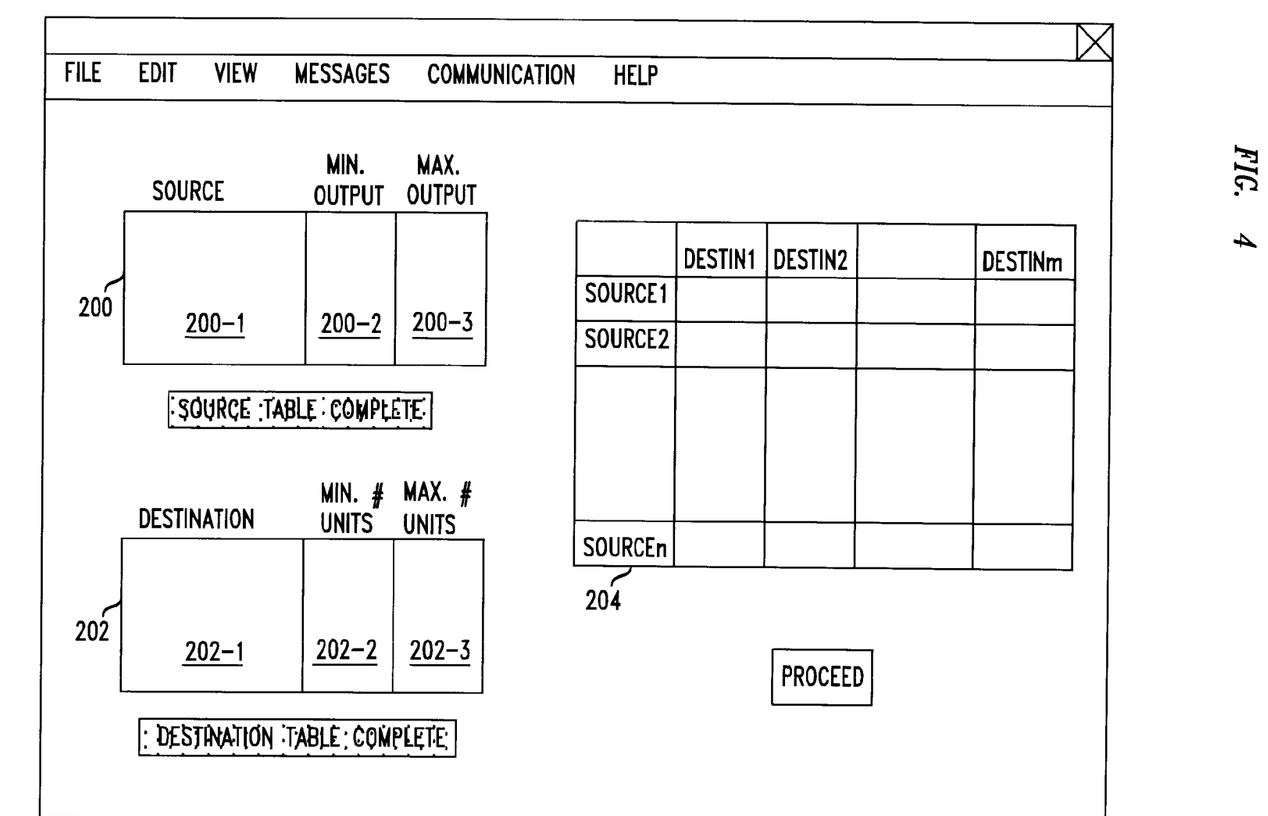
FIGS. 4–6 illustrate the process by which a minimum transportation cost problem is solved.

FIG. 4 illustrates the user interface following a selection of the area marked "integer" that emanates from the "Minimum Direct Transportation Cost" node, which emanates from the "Optimization" node. Area 200 in FIG. 4 is a three-column grid box that allows the user to enter records. Each record specifies the identity of a source (in column 200-1), an integer that reflects the minimum output from the specified source (in column 200-2), and an integer that reflects the maximum output from the specified source (in column 200-3). Any number of records may be provided by the user. Having provided a number of records for the table of area 200, area 202 is enabled when the "Source Table Complete" command button is pressed, allowing the user to populate the three-column grid box of area 202 with records. The records of the area 202 grid box specify a shipping destination for the goods produced by the sources identified in column 202-1, an integer corresponding to the minimum number of units of those goods that are shipped to the specified destination (column 202-2), and an integer corresponding to the maximum number of units of those goods that are shipped to the specified destination (column 202-3). The number of records in the grid box of area 202 need not be the same as the number of records in the grid box of area 200. Having completed the two grid boxes, the presses the "Destination Table Complete" command button, in response to which the server constructs a grid box in area 204 having a number of rows equal to the number of sources (not counting the titles row) and a number of columns equal to the number of destinations (not counting the titles row). The user is then invited to enter the various unit costs of transporting goods from the sources to the destinations. Once that information is provided, a click on the "Porceed" command button initiates the actual computations within the server of FIG. 1, based on the information that was provided in the grid box of area 204.

Figure 5:
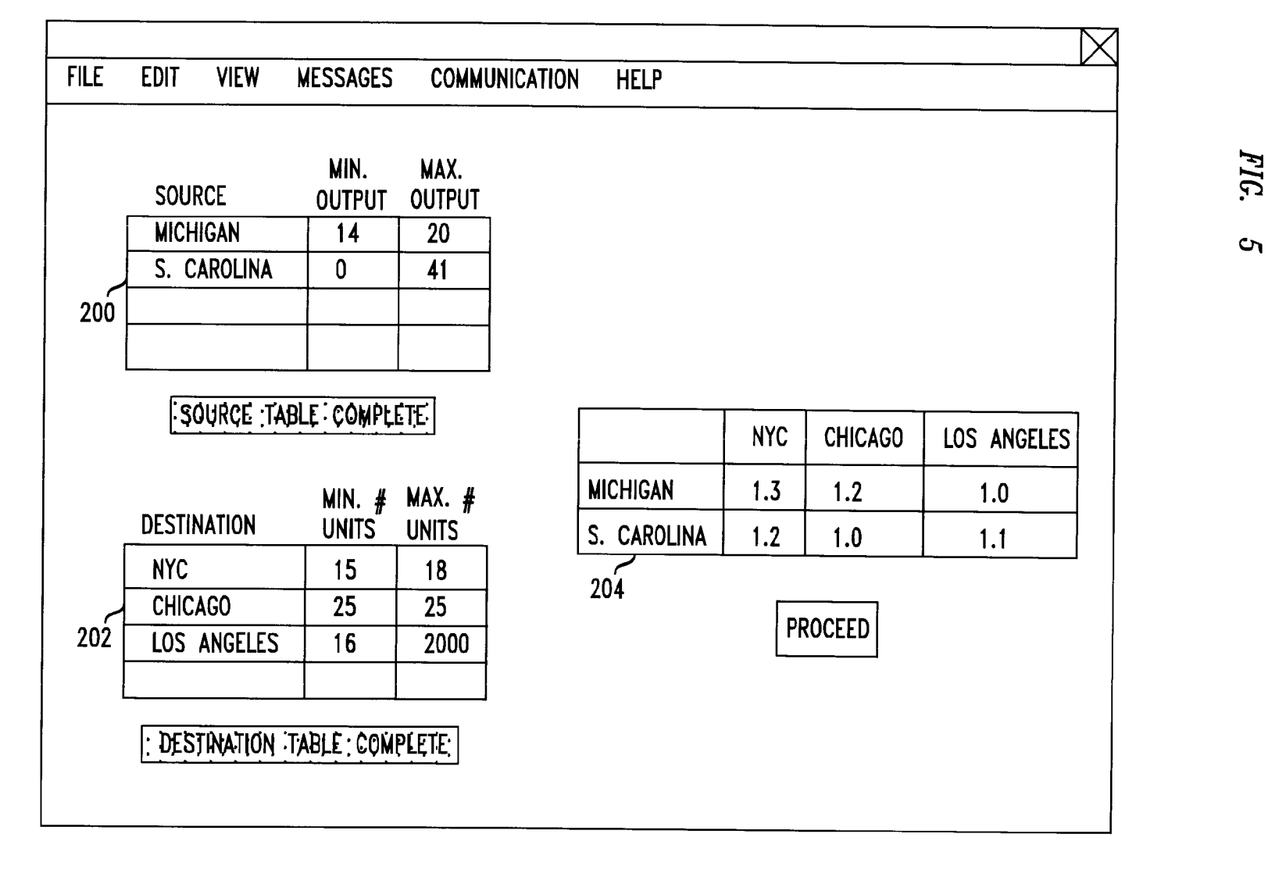

FIG. 5 illustrates a specific example, where the user provided particular information. In response to the provided data and following the computation, server 10 (of FIG. 1) sends a solutions web page not unlike the one shown in FIG. 6, which includes a solution table 205 that contains the results of the calculations, and a sensitivity table 206. The interpretations of these results are quite simple. Table 205 states that it is optimal to send

Figure 6:
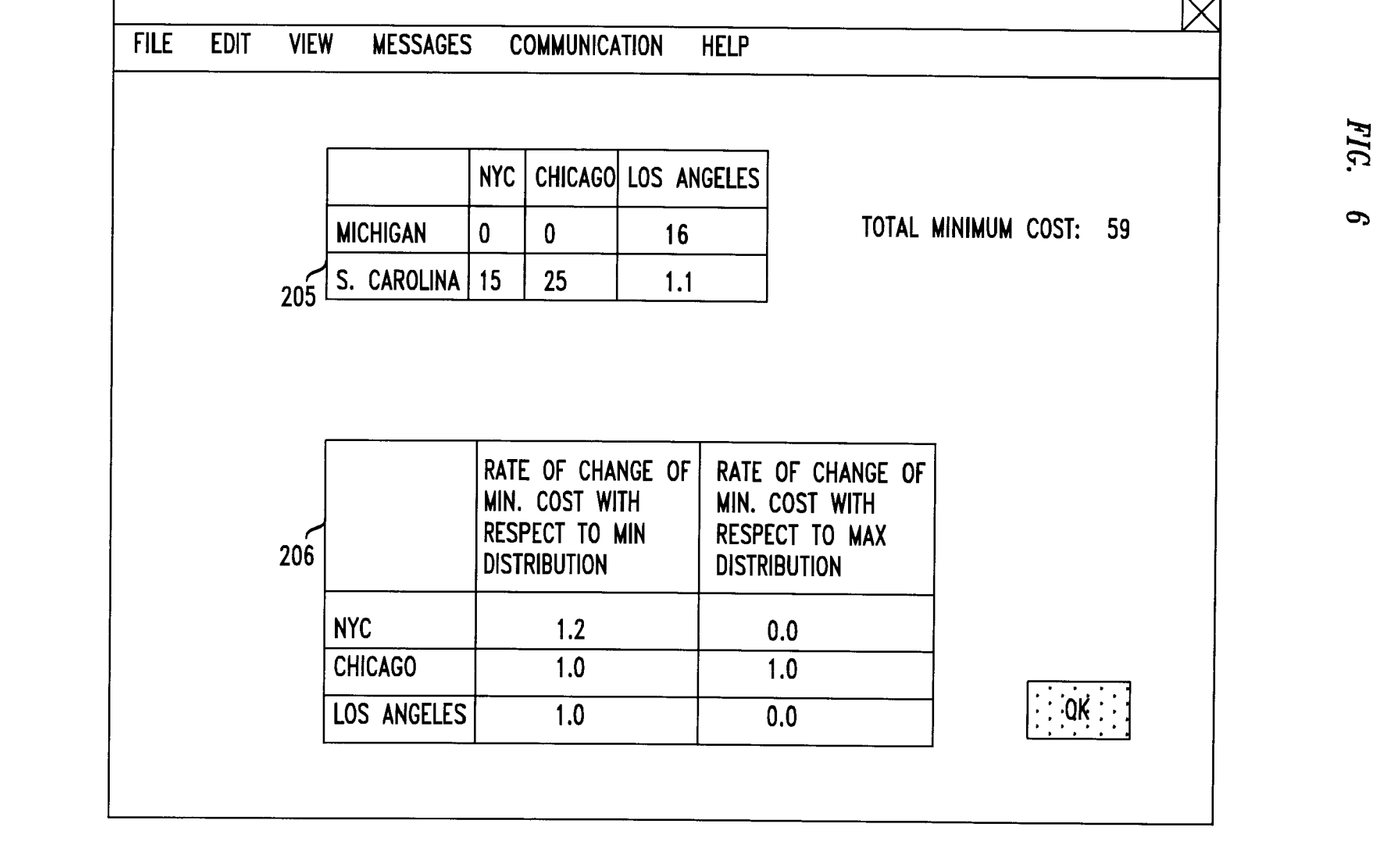

- 0 widgets from the Michigan plant to NYC,
- 0 widgets from the Michigan plant to LA,
- 16 widgets from the Michigan plant to Chicago,
- 15 widgets from the South Carolina plant to NYC,
- 25 widgets from the South Carolina plant to LA,
- 0 widgets from the South Carolina plant to Chicago, and that the total minimum cost is 59. The sensitivity of the solution to variations (table 206) is:

- at the margin, each unit decrease in the minimum distribution to NYC constraint results in a decrease in cost of 1.2 units;
- at the margin, each unit decrease in the maximum distribution to NYC constraint results in a decrease in cost of 0 units;
- at the margin, each unit decrease in the minimum distribution to LA constraint results in a decrease in cost of 1 units;
- at the margin, each unit decrease in the maximum distribution to LA constraint results in a decrease in cost of 1 units;
- at the margin, each unit decrease in the minimum distribution to Chicago constraint results in a decrease in cost of 1 units; and
- at the margin, each unit decrease in the maximum distribution to Chicago constraint results in a decrease in cost of 0 units.

The minimum direct transportation cost problem (integer values) that was solved for the user (FIGS. 4–6) employed a software module that corresponds to a generic mathematical problem known as linear programming.

Figure 7:
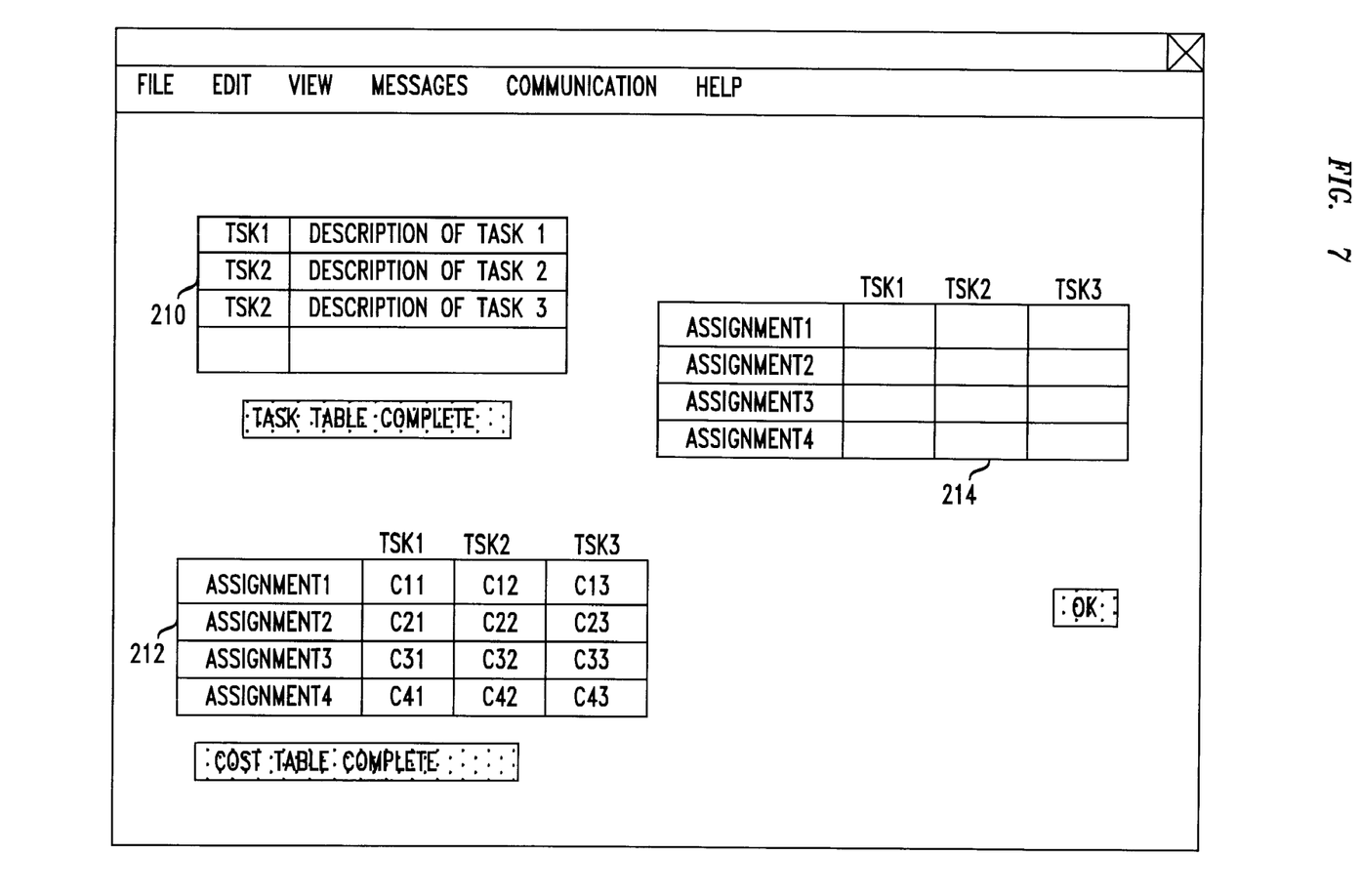
FIGS. 7–8 shows the process by which a minimum task assignment cost problem is solved.
Figure 8:
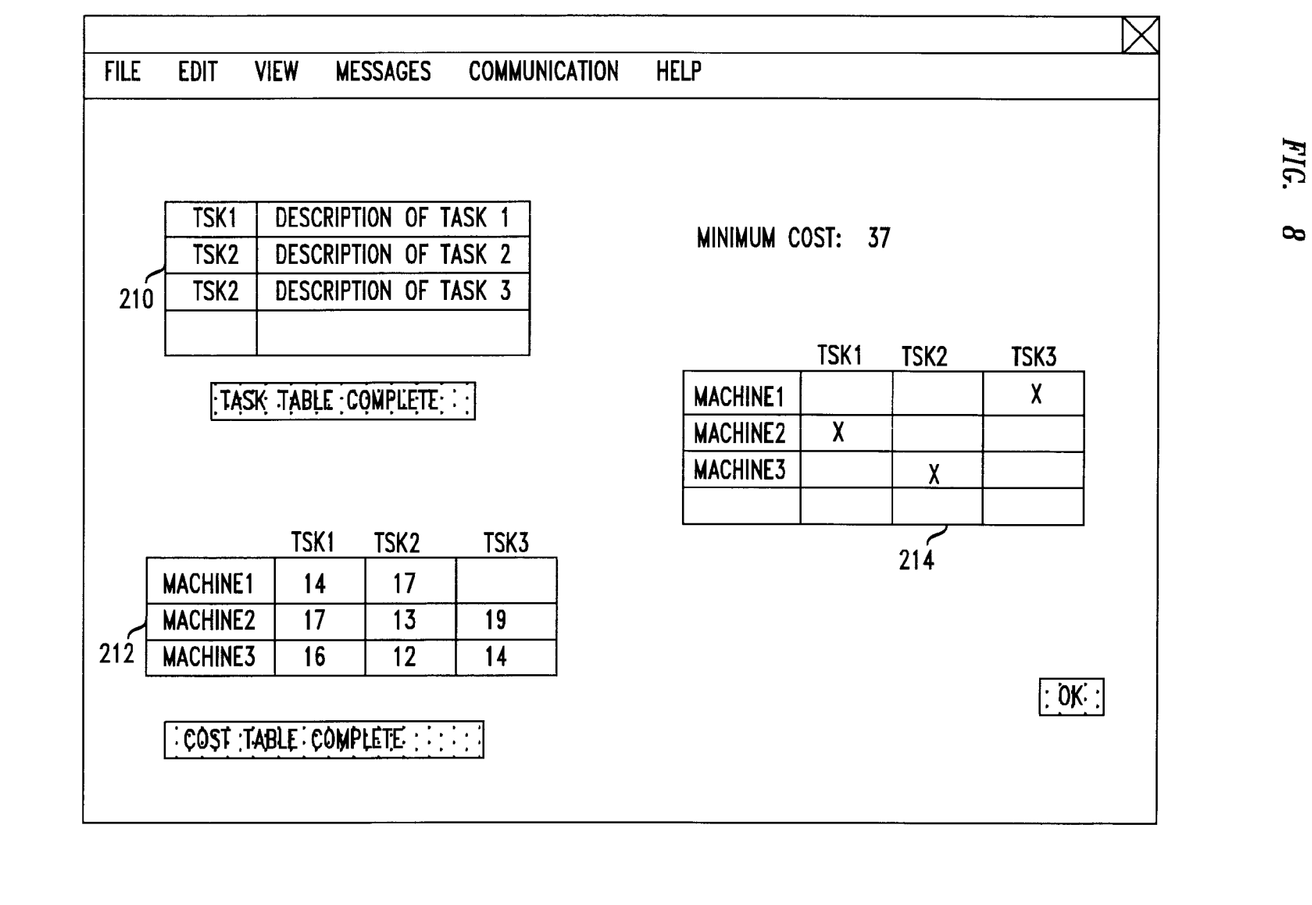

FIG. 7 presents another example; one for minimizing task assignment costs. In this problem, the server first provides a web page with a grid box 210 where the user is invited to specify a plurality of tasks. Each record identifies the task and specifies an abbreviation. Following a click of the "Task Table Complete" command button, the server provides a grid 212 having a number of columns equal to the number of tasks (not counting the titles) and invites the user to enter records in the table. Each record specifies an assignee (in column 212-1) and a cost for assigning to the assignee the particular task. Clicking on the "Cost Table Complete" button following the entry of such costs triggers the execution of a program within the FIG. 1 server, and the results of the calculations made by the program are delivered to the user in the form of a table, such as the one in area 214 of FIG. 7. FIG. 8 presents a specific problem of the type described in FIG. 7, and its solution. It so happens that the minimum task assignment cost problem is also a linear programming problem, but of course, it didn't have to be.

An important aspect of this disclosure is that the user did not need to know what type of a mathematical problem is represented by the business problem that the user wishes to solve. The user arrived at the correct business problem based simply on business needs and business knowledge, without having any knowledge of the arcane "operations research" field, and the mathematical formulations that are employed therein. Correspondingly, the solutions presented to the user are couched in, or expressed in, the same business terms by which the user formulated the business problem.

The principles disclosed herein are aimed at improving "real-world" systems. One such improving occurs with the user employs the principles of this invention to a business-related problem and then applies the results of the solution provided by such application of the principles disclosed herein to the system. In the transportation cost problem that is presented above, for example, the developed solutions are sent to the sources, directing them to send the goods in specified quantities to specified destinations. There are many other "real world" types of problems that the application of the principles disclosed herein can be applied to a relevant system is a similar manner. Another type of "real world" benefit that the application of the principles disclosed is in the area of design of a system. Still another type of problem to which the application of the principles disclosed herein may be applied is decision-making problems. For example, the rather simple mortgage calculation problem may be used by a person to decide whether the person ought to undertake a mortgage or not.

The above presents the principles of this invention with the aid of an illustrative embodiment. Skilled artisans would realize, however, that different embodiments are possible that represents changes and/or modifications from the embodiment described above. For example, the embodiment disclosed above is Internet-based, but that is not a requirement. A practical embodiment can be had where the connection to a sever is effected with modem-based communication directly to the server (i.e., not through the Internet). Another practical embodiment can be has by installing a software package in the user's PC, workstation or terminal, and practicing the invention "off line." Also for example, the explanatory notes can be inserted into a separate, dedicated area of the display element associated with the user's computer, in contrast to the manner the explanatory notes are presented to the user in FIG. 3, where the note covers part of the display.

What is claimed is:

1. A computer-based method executed in a server that is coupled to a user terminal via a network, for solving business problems comprising the steps of:

through said network, presenting to said terminal signals that said terminal converts to a display having a plurality of entries, at least some of which identify problem categories, said categories taken from a set that includes optimization, queuing theory, inventory and forecasting categories, and at least others of which identify particular types of business problems associated with said categories, which business problems that require multi-step mathematical processing in order to advance to solutions;

accepting digital signals from said terminal, through said network, which signals represent a selection by the user of a business problem identified in said display;

launching execution of a software module within said server that corresponds to the accepted selection;

interactively inviting said user to provide to said software module digital signals representative of parameter information that is needed to formulate a specific instance of the selected problem, so that said module can advance said specific problem to a solution, and accepting digital signals responsive to said step of inviting;

developing a solution to said business problem, responsive to said information that specifies, that provides solution information to said user that, when applied to said business problem, effects a solution to said business problem;

said software module developing a solution to said specific business problem, responsive to said parameter information; and transmitting information relative to said solution via said network to said terminal.

2. The method of claim 1 further comprising a step of said user taking action in response to information received by said terminal as a result of said step of transmitting.

3. The method of claim 2 where said step of taking action comprises creating a hard copy of said solution information.

4. The method of claim 1 where said business problem selected by a user relates to a business system, further comprising said user performing a step of taking action pursuant to said solution information that affects said system.

5. The method of claim 4 where said system is an existing system and said taking action comprises affecting operation of said exiting system.

6. The method of claim 4 where said taking action comprises affecting design of said system.

7. The method of claim 4 where said taking action comprises formulating decisions and acting on said decisions.

8. The method of claim 4 where said taking action comprises affecting work-flow in said system.

9. The method of claim 1 further comprising a step, responsive to a pointing to an entry in said display and a request for augmented explanation, by means of a point-and-click operation by said user, of presenting to said user an augmented display that includes an explanation note.

10. The method of claim 9 where said explanation note covers part of the display.

11. The method of claim 9 where said explanation note is in a dedicated area on a terminal that displays said display, outside of said display.

12. The method of claim 1 where said display displays all of said problem categories in a single screen of said display.

13. The method of claim 1 where said display has an organizational structure.

14. The method of claim 13 where said structure is hierarchical.

15. The method of claim 14 where display has a tree structure.

16. The method of claim 1 where said software module is taken from a set of generic mathematical problem solving modules.

* * * * *